(No Model.)

R. M. DALTON.
COMBINED SPRINKLER AND SEEDER.

No. 451,107. Patented Apr. 28, 1891.

WITNESSES
C. J. Shipley
F. Clough.

INVENTOR
Robert M. Dalton,
By Wells W. Leggett.
Attorney.

UNITED STATES PATENT OFFICE.

ROBERT M. DALTON, OF NORRIS, ASSIGNOR TO THE DALTON MANUFACTURING COMPANY, OF DETROIT, MICHIGAN.

COMBINED SPRINKLER AND SEEDER.

SPECIFICATION forming part of Letters Patent No. 451,107, dated April 28, 1891.

Application filed December 12, 1890. Serial No. 374,500. (No model.)

*To all whom it may concern:*

Be it known that I, ROBERT M. DALTON, a citizen of the United States, residing at Norris, county of Wayne, State of Michigan, have invented a certain new and useful Improvement in a Combined Sprinkler and Seeder; and I declare the following to be a full, clear, and exact description of the invention, such as will enable others skilled in the art to which it pertains to make and use the same, reference being had to the accompanying drawings, which form a part of this specification.

Figure 1:
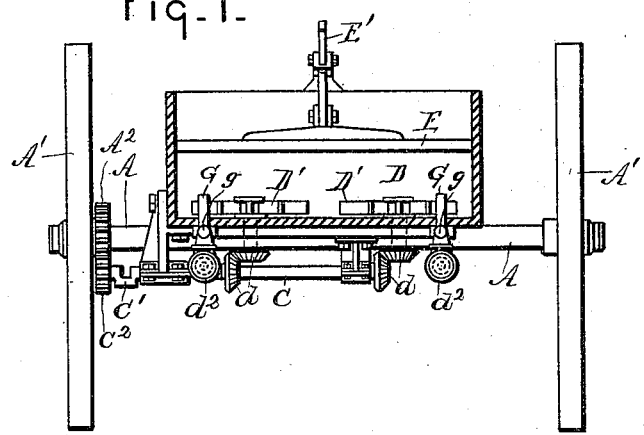
Figure 2:
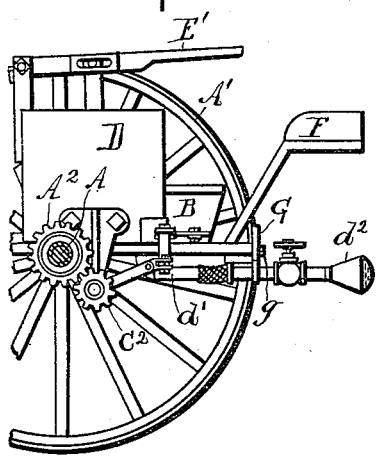
Figure 3:
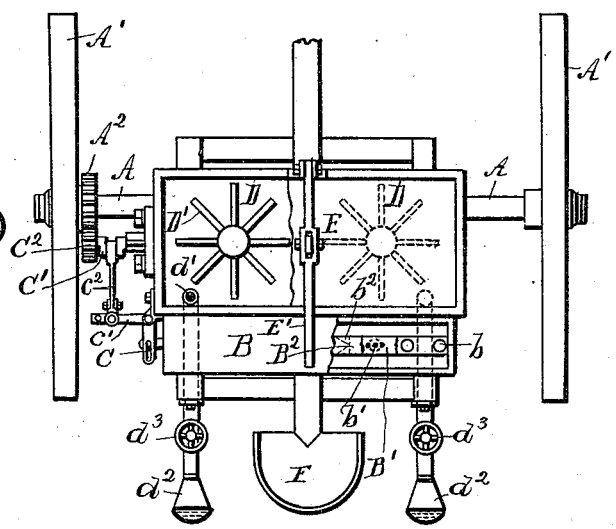

In the drawings, Figure 1 is a view in elevation of a seeder embodying my invention with the tank in section and seed-box removed. Fig. 2 is a side elevation of the same with one wheel removed. Fig. 3 is a plan view.

It is the purpose of my invention to provide a novel seeding-machine and a sprinkler designed to sprinkle liquid fertilizer, or, if need be, to sprinkle antiseptic substances or liquid poison designed to destroy bugs and vermin, and in the drawings is presented an organization designed to accomplish these results.

In carrying out my invention, A is the axle of my machine, and A' the wheels.

$A^2$ is a gear on the axle.

B is the seed-box. It is provided with a series of orifices $b$ in its bottom of, say, an inch (more or less) in diameter. Above this bottom is a sheet or strip of metal B', provided with a series of small orifices $b'$, located over the larger orifices $b$, and through which the grain is fed.

$B^2$ is the seed-slide, provided with orifices $b^2$ for engaging the requisite amount of seed, dragging the same over the orifices $b'$ and dropping them down through the discharge-orifices $b$ at the proper stated intervals. This feeder $B^2$ is engaged to one of the arms of a bell-crank lever $c$, while the other arm $c'$, by a pitman $c^2$, is engaged with the crank C' on the shaft C, and this shaft has at its extremity a pinion $C^2$, engaging the gear $A^2$ on the wheel A' or axle A. This serves to drop the seed at proper and stated intervals. More or less throw may be given to the feeder $B^2$ by adjusting the pitman $c^2$ into one or the other of the holes in the arm $c'$ of the bell-crank lever.

D is a tank for holding the liquid to be sprinkled. It is provided at its bottom with one or more stirrers D', which are rotated by the shaft C through the medium of suitable gear engagements $d$.

$d'$ represents exit-pipes for the liquid, and $d^2$ suitable sprinkling roses or spouts through which the liquid is sprayed onto the ground.

E is a follower engaged with a lever E'. This follower is designed to force out the liquid if at any time the passages become clogged or the feed is not sufficiently rapid through the exit-pipes. The rapidity of the feed through the exit-pipes may be governed also by valves $d^3$.

F is the driver's seat.

By this contrivance it is manifest that there may be accomplished the simultaneous seeding and sprinkling of the soil, thus performing at a single operation what has heretofore required two operations, and applying the liquid at the time when it is most needed.

Of course the machine may be provided with the usual drill-teeth and seed spouts for directing the seed to the ground, or the seed may be delivered in any other suitable way. A lever G, pivoted at $g$, connects with the exit-pipes $d'$ for the purpose of moving them laterally, and thereby giving any desired direction to the spray issuing from the roses or spouts $d^2$.

What I claim is—

1. The combination, in a single apparatus, of a seeding-machine having seed-dropping mechanism operated by the ground-wheels, and a sprinkler having sprinkling roses or spouts for simultaneously planting seed and sprinkling the same with liquid fertilizer or other solution, substantially as described.

2. The combination, in a single apparatus, of a seeding-machine having seed-dropping mechanism, a sprinkler provided with sprinkling roses or spouts and rotating agitators, and gearing actuated by the ground-wheels for simultaneously operating the seed-dropping mechanism and the rotating agitators of the sprinkler, substantially as and for the purpose described.

3. The combination of the seeding-machine and sprinkler, the latter provided with a follower within the tank, whereby manual pressure may be applied to facilitate clearing the passages of any impediments, substantially as described.

4. The combination, in a single apparatus, of a seeding-machine consisting of a seed-box with orifices $b$, an interior plate with smaller orifices $b'$, a feeder or dropper provided with seed-cavities $b^2$, said dropper actuated by a bell-crank lever and pitman connection with the crank $C'$, and a sprinkler with stirrers actuated by the shaft $C$, the latter meshing with a suitable gear on the axle $A$ or wheel $A'$, substantially as described.

In testimony whereof I sign this specification in the presence of two witnesses.

ROBERT M. DALTON.

Witnesses:
C. J. SHIPLEY,
MARION A. REEVE.